(12) United States Patent
Timm et al.

(10) Patent No.: US 9,193,134 B2
(45) Date of Patent: *Nov. 24, 2015

(54) AUTOMOBILE BODY PART

(71) Applicant: Novelis Inc., Atlanta, GA (US)

(72) Inventors: Juergen Timm, Steisslingen (DE); Corrado Bassi, Salgesch (CH)

(73) Assignee: Novelis Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,044

(22) Filed: Nov. 18, 2014

(65) Prior Publication Data

US 2015/0072169 A1   Mar. 12, 2015

Related U.S. Application Data

(63) Continuation of application No. 13/055,910, filed as application No. PCT/EP2009/060370 on Aug. 11, 2009, now Pat. No. 8,940,406.

(30) Foreign Application Priority Data

Aug. 13, 2008   (EP) ..................... 08162298

(51) Int. Cl.
   *B32B 15/01*   (2006.01)
   *C22C 21/02*   (2006.01)
   (Continued)

(52) U.S. Cl.
   CPC ............... *B32B 15/016* (2013.01); *C22C 21/00* (2013.01); *C22C 21/02* (2013.01); *C22C 21/08* (2013.01); *Y10T 428/12764* (2015.01)

(58) Field of Classification Search
None
See application file for complete search history.

(56) References Cited

U.S. PATENT DOCUMENTS

| | | | |
|---|---|---|---|
| 1,911,080 A | 5/1933 | Keller et al. | |
| 3,177,073 A | 4/1965 | Foerster | |
| 3,252,841 A | 5/1966 | Foerster | |

(Continued)

FOREIGN PATENT DOCUMENTS

| | | |
|---|---|---|
| CA | 2363116 | 9/2000 |
| CN | 102119078 | 7/2011 |

(Continued)

OTHER PUBLICATIONS

U.S. Appl. No. 13/055,010, "Non-Final Office Action", Mar. 28, 2014, 12 pages.
U.S. Appl. No. 13/055,910, "Final Office Action", Oct. 4, 2013, 12 pages.
U.S. Appl. No. 13/055,910, "Office Action", Feb. 4, 2013, 9 Pages.
U.S. Appl. No. 13/467,328, "Final Office Action", Oct. 4, 2013, 8 pages.

(Continued)

*Primary Examiner* — Mark Ruthkosky
*Assistant Examiner* — Daniel J Schleis
(74) *Attorney, Agent, or Firm* — Kilpatrick Townsend & Stockton, LLP

(57) ABSTRACT

The present invention relates to an automotive clad sheet product comprising a core layer and at least one clad layer wherein the core comprises an alloy of the following composition in weight %: Mg 0.45-0.8, Si 0.45-0.7, Cu 0.05-0.25, Mn 0.05-0.2, Fe up to 0.35, other elements (or impurities) <0.05 each and <0.15 in total, balance aluminum; and the at least one clad layer comprises an alloy of the following composition in weight %: Mg 0.3-0.7, Si 0.3-0.7, Mn up to 0.15, Fe up to 0.35, other elements (impurities) <0.05 each and <0.15 in total, balance aluminum. The clad automotive sheet product provides excellent hemmability which does not substantially change over time and yet also provides a good age-hardening response after bake hardening.

17 Claims, 2 Drawing Sheets

(51) Int. Cl.
C22C 21/08 (2006.01)
C22C 21/00 (2006.01)

(56) References Cited

U.S. PATENT DOCUMENTS

| | | | |
|---|---|---|---|
| 3,816,190 | A | 6/1974 | Warbichler et al. |
| 3,990,922 | A | 11/1976 | Gullotti et al. |
| 4,082,578 | A | 4/1978 | Evancho et al. |
| 4,525,326 | A | 6/1985 | Schwellinger et al. |
| 5,141,703 | A | 8/1992 | Schmid et al. |
| 5,266,130 | A | 11/1993 | Uchida et al. |
| 5,303,763 | A | 4/1994 | Aghajanian et al. |
| 5,616,189 | A | 4/1997 | Jin et al. |
| 6,267,922 | B1 | 7/2001 | Bull et al. |
| 6,652,678 | B1 | 11/2003 | Marshall et al. |
| 6,780,259 | B2 | 8/2004 | Bull et al. |
| 6,939,416 | B2 | 9/2005 | Benedictus et al. |
| 6,994,760 | B2 | 2/2006 | Benedictus et al. |
| 2002/0031682 | A1 | 3/2002 | Dif et al. |
| 2003/0087122 | A1 | 5/2003 | Benedictus et al. |
| 2003/0127165 | A1 | 7/2003 | Magnusen et al. |
| 2004/0094249 | A1 | 5/2004 | Uchida et al. |
| 2004/0238605 | A1 | 12/2004 | Nishimura et al. |
| 2004/0250928 | A1 | 12/2004 | Bull et al. |
| 2005/0028894 | A1 | 2/2005 | Hoffmann et al. |
| 2007/0039669 | A1 | 2/2007 | Reiso et al. |
| 2007/0137738 | A1 | 6/2007 | Bassi et al. |
| 2009/0165901 | A1 | 7/2009 | Koshigoe et al. |
| 2009/0202860 | A1 | 8/2009 | Lahaije |
| 2011/0165437 | A1 | 7/2011 | Timm et al. |
| 2012/0234437 | A1 | 9/2012 | Bassi et al. |
| 2014/0035323 | A1 | 2/2014 | Bassi et al. |

FOREIGN PATENT DOCUMENTS

| | | |
|---|---|---|
| DE | 2328748 | 1/1975 |
| DE | 2735473 | 2/1978 |
| DE | 69410344 | 4/2003 |
| EP | 623462 | 11/1994 |
| EP | 811700 | 12/1997 |
| EP | 997547 | 5/2000 |
| EP | 1170118 | 1/2002 |
| EP | 1533394 | 5/2005 |
| EP | 1852250 | 11/2007 |
| EP | 2328748 | 6/2011 |
| EP | 1392877 | 8/2011 |
| ES | 2328748 | 11/2009 |
| FR | 2328748 | 8/1979 |
| FR | 2900664 | 11/2007 |
| FR | 2922222 | 4/2009 |
| GB | 2328748 | 2/2002 |
| JP | H09-067659 | 3/1997 |
| JP | 2000129382 | 5/2000 |
| JP | 2011530657 | 12/2011 |
| JP | 5432262 | 12/2013 |
| KR | 1020110044993 | 5/2011 |
| MX | 297132 | 10/2014 |
| WO | 0052216 | 9/2000 |
| WO | 0224371 | 3/2002 |
| WO | 02090609 | 11/2002 |
| WO | 03006697 | 1/2003 |
| WO | 03010348 | 2/2003 |
| WO | 2004001086 | 12/2003 |
| WO | 2007128391 | 11/2007 |

OTHER PUBLICATIONS

U.S. Appl. No. 13/467,328, "Non Final Office action", Mar. 28, 2013, 7 pages.
U.S. Appl. No. 13/467,328, "Non final office action", Sep. 24, 2014, 8 Pages.
Aleris Aluminum Duffel BVBA, "Notice of Opposition against European Patent No. 2328748 B1", Oct. 31, 2012, 24 pages.
Aluminum Association, "International Alloy Designation and Chemical Composition Limits for Wrought Aluminum and Wrought Aluminum Alloys", 2009, 36 pages.
AMAG Rolling GMBH, "Notice of Opposition against European Patent No. 2328748 B1", Oct. 31, 2012, 7 pages.
ASTM E290-09, "Standard Test Methods for Bend Testing of Material for Ductility", 10 pages.
Belov et al., "Chapter 2: Alloys of the Al—Mg—Si—Fe System", Multicomponent Phase Diagrams: Applications for Commercial Aluminum Alloys, Jul. 2005, pp. 47-82, Elsevier, Mar. 28, 2014, pp. 47-82.
Canada Application No. 2,731,669, "Office Action", Feb. 28, 2014, 2 pages.
China Application No. 200980131346.2, "Office Action", May 9, 2014, 4 pages.
China Application No. 200980131346.2, "Office Action", Nov. 7, 2013, 5 Pages.
China Application No. 200980131346.2, "Office Action", Feb. 20, 2013, 7 Pages.
Comalco, "The Selection, Processing and Application of 6000 Series Aluminium Extrusion Alloys", Technical Report No. 6, Sep. 2001.
Davis, "ASM Specialty Handbook, Aluminum and Aluminum Alloys", ASM International, Materials Park, OH, 1993, 3 pages.
Develay, "Traitements de mis en solution, trempe, maturation, revenu, ou traitement de durcissement structural", Techniques de l'Ingenieur, Paris, XP008032501, 1993, pp. 1-20.
European Application No. 03405826.3, "European Search Report", Aug. 13, 2004, 3 pages.
European Application No. 04798 037.0, "Office Action", Feb. 21, 2014, 4 pages.
Furrer, "Neue Aluminium-Blechwerkstoffe fur den Karosseriebau", Werkstoffsymposium Fahrzeugtechnik, Jun. 5, 2007, 29 pages.
Hufnagel, "4 Keys to Aluminium Alloys", 4th Edition, 1992, pp. 195-205.
Hydro Aluminium Rolled Products, "Notice of Opposition against European Patent No. 2328748 B1", Oct. 31, 2012, 10 pages.
Japanese Application No. 2011522500, "Office Action", May 21, 2013.
Kammer, "Aluminum Taschenbuch 1", Dec. 2002, pp. 682-683.
Korean Application No. KR10-2011-7028832, "Judicial Decision Dismissing Appeal", Aug. 8, 2013, 16 pages.
Korean Application No. KR10-2011-7028832, "Office Action", Feb. 6, 2014.
Napalkov et al., "Continuous Casting of Aluminum Alloys", Moscow: Internet Engineering, 2005, p. 501.
Ostermann, "Anwendungstechnologie Aluminium", 2, neu bearbeitete und aktualisierte Auflage, 2007, p. 150.
International Application No. PCT/EP2004/013233, "International Preliminary Report on Patentability", Aug. 29, 2006, 6 pages.
International Application No. PCT/EP2004/013233, "International Search Report & Written Opinion", Aug. 1, 2005, 16 pages.
International Application No. PCT/EP2009/060370, "International Preliminary Report on Patentability", Mar. 12, 2010, 6 pages.
International Application No. PCT/EP2009/060370, "International Search Report & Written Opinion", Nov. 4, 2009, 8 pages.
Russian Application No. 2011109160, "Office Action", Apr. 12, 2013.
U.S. Appl. No. 14/027,718, "Non-Final Office Action", Jul. 18, 2014, 8 pages.
European Application No. 04798037.0, Office Action mailed Dec. 1, 2014 with English Translation (6 pages).
U.S. Appl. No. 13/467,328, Final Office Action mailed Jan. 14, 2015 (11 pages).
U.S. Appl. No. 14/027,718, Final Office Action mailed Feb. 26, 2015, 8 pages.
Chinese Patent Application No. 200980131346.2, Notification of Reexamination mailed May 22, 2015, 12 pages with English Translation.
*Aluminum Alloys and Manual for Processing the Same ($2^{nd}$ edition)*, edited by Wang Zhutang, et al., Central South University Press, published Oct. 2000, p. 251.

AUTOMOBILE BODY PART

This application is a continuation of U.S. application Ser. No. 13/055,910, filed Mar. 16, 2011, which is a U.S. National Phase application of PCT Application No. PCT/EP2009/060370, filed Aug. 11, 2009, which claims priority to European Patent Application No. 08162298.7, filed Aug. 13, 2008, the contents of each of which are incorporated by reference in their entireties.

This invention concerns a composite aluminium sheet primarily intended for use in automotive applications. The sheet product comprises a core of a 6XXX series aluminium alloy and at least one clad layer of another 6XXX series aluminium alloy.

The use of aluminium sheet materials in the production of automobiles has been established for many years. A range of different alloys are used depending on the particular requirements of the automobile designers for specific components. In certain applications it is desirable that the material be of high strength. Yet other applications require higher formability and, in such cases, strength may be considered less important. There has also been a desire for materials that deform easily under impact, for example in the event of collision with pedestrians and such materials may have even lower strengths.

Formability for automotive sheet users means two requirements. There is the formability of the sheet through its thickness which generally relates to the bulk shaping of sheet. The second is the extent to which the sheet can be bent around a tight radius. This latter requirement is important for some automotive parts where the sheet is bent back on itself to create a means of attachment to underlying support panels. This bending back is known as hemming and a sheet which is capable of being bent round a tight radius in this way without cracking is said to possess good hemmability.

Typically the aluminium alloys used for this purpose are from the 6XXX series of alloys, namely those whose principal alloying elements are Mg and Si, or from the 5XXX series of alloys, where the principal alloying element is Mg. For an understanding of the number designation system most commonly used in naming and identifying aluminium and its alloys see "International Alloy Designations and Chemical Composition Limits for Wrought Aluminum and Wrought Aluminum Alloys", published by The Aluminum Association, revised January 2001.

In many applications it is desirable that the material be readily formed and yet, following a paint-bake treatment, develops sufficient mechanical strength. 6XXX series alloys are particularly suitable for this because of their ageing response. A significant amount of work has taken place over the last 15 to 20 years to understand the ageing processes in these alloys and various processes exist to maximize the so-called paint-bake response, (PBR), being the difference in tensile properties from the as-supplied (hereafter T4) temper to the final (hereafter T8) temper after forming and bake hardening.

It is well known that a lower T4 yield strength and reduced Fe content will promote improved formability, particularly hemming performance. A lower yield strength relates to the ease of deformation. That is, a lower yield strength means the sheet can be shaped using lower working loads. Elongation relates to the extent of deformation. A low yield strength can be achieved by reducing the solute content of the alloy but the lower solute content usually reduces the paint bake response. One such alloy is marketed under the name Anticorodal®-170 (hereafter AC170). Another alloy is known from EP1685268, where the alloy is solution heat treated in such a manner to avoid significant age hardening. Of these two, the alloy according to EP1685268 has a lower solute content and possesses excellent hemmability. AC170 (also having a relatively low solute content compared with high strength alloys like AA6111), on the other hand, possesses slightly inferior hemmability compared with the alloy from EP1685268 but does age harden. On the other hand, with AC170 the hemmability deteriorates over time as the alloy age hardens, in particular when prestrained before hemming.

As mentioned above there is usually a compromise between mechanical strength and hemmability. Although hemmability is the focus of this invention it is useful to automotive designers if the material is capable of age hardening during paint baking to some extent. This allows the designer to optimize weight savings through gauge reductions. It is also desirable if the mechanical properties remain relatively stable over time in sheet delivered to automotive manufacturers. This is because, after delivery of sheet, there may be some delay before such sheet is used in production of automotive body parts. If, for example, the hemmability changes during that period, (which can be for several months), the user of the sheet may find it less conducive to their manufacturing methods. Alternatively, the sheet might be formed into a panel or a hood at an earlier date but only joined to other components at a later date. Where the joining method involves hemming, it is desirable that the hemming performance change little over the intervening time period.

Japanese patent application JP62-207642 published on 12 Sep. 1987 suggests cladding a 6XXX series alloy core with a 5XXX series alloy clad layer although the composition range claimed for the clad layer encompasses or overlaps with some 6XXX series alloys. This publication teaches that a Si content above 0.5 wt % in the clad layer is undesirable because it will reduce formability. The mix of 6XXX series and 5XXX series alloys in such a product makes it less favourable for recycling. This publication says nothing about the hemming performance of the clad sheet products.

The combination of 6XXX series alloys with 1XXX and 3XXX series alloys is disclosed in US2006-0185816. In particular the combination of a core of conventional composition alloy AA6111 was produced with clad layers of conventional AA3003 or AA3104. The composite structure provided an improvement in formability when compared with monolithic AA6111. Hemming performance was not disclosed.

WO07/128391 discloses a composite product comprising the combination of 6XXX series alloys in the core with 6XXX series alloys in the clad layer. Despite the broad claims the description contains only 2 examples where the core alloys are either AA6016 or AA6111 and the clad layer is AA6005A. The hemming performance of the composite products was better than that of the monolithic core alloys alone, although there is no report of how the hemming performance changes over time.

JP2000-129382 also discloses cladding a 6XXX series alloy containing Cu with another layer of 6XXX series alloy without Cu. Formability is measured through elongation—a measure of the extent of bulk formability, not hemmability.

None of these prior art disclosures suggest a combination of alloys in core and clad layers that provide extremely good hemming characteristics also after prestraining, hemmability which remains excellent after ageing, whilst also showing the ability to be significantly age hardened during paint baking.

It is, therefore, an object of the invention to provide an aluminium alloy clad product possessing excellent hemming performance, where the hemming performance remains excellent after substantial periods of natural ageing and prestraining, and which is capable of age hardening.

This object is achieved by the clad automotive sheet product comprising the features as claimed herein. Preferred embodiments of the invention are set out in the dependent claims, respectively.

The term "sheet", as herein broadly used, is intended to embrace gauges sometimes referred to as "plate" or "foil" as well as sheet gauges intermediate plate and foil.

The reasons for limiting the alloying constituents in a manner as realized in the claims are given below. All values are in weight %.

Mg: The Mg content in the core layer is set to be 0.45-0.8. Preferably, the Mg content is 0.5-0.7, most preferable about 0.6. The Mg content in the at least one clad layer is set to be 0.3-0.7. Preferably, the Mg content in the clad layer is 0.4-0.6, most preferably about 0.5.

Si: The Si content in both the core and clad layer is set to be 0.45 to 0.7. Preferably, the Si content in the core layer is 0.5 to 0.7, most preferably about 0.6. The Si content in the at least one clad layer is between 0.3-0.7. Preferably, the Si content in the at least one clad layer is 0.4-0.6, most preferably about 0.5.

Mg and Si combine mostly as $Mg_2Si$, imparting strength improvement after age-hardening. Too little of either Mg or Si and the age-hardening obtained is minimal and this establishes the lower limit for each element of 0.45 for the core alloy composition. The upper content of Mg and Si is limited, however, because excess Si is detrimental to formability in general, especially with respect to the minimum crack-free bending radius of the sheet. The Mg and Si contents are, therefore, balanced in a manner as to achieve the desired strengthening effect and to prevent a high amount of excess Si in the material.

Fe: The Fe content in both the core and the at least one clad layer is set to be less than 0.35. The Fe content is known to have a significant effect on minimum crack-free bending radius. Fe is usually not soluble in aluminium but is present as second phase constituents, e.g. an AlFe(Mn)Si phase, frequently located at grain boundaries. Upon bending, cracking initiates at constituent interfaces and propagates. It is therefore believed that low Fe content and preferably a fine distribution of the iron-bearing phases improves the bending characteristics of the sheet product.

Cu: The Cu content in the core layer is set to be 0.05-0.25. An addition of Cu within this range provides additional strengthening beyond that obtained simply from $Mg_2Si$ precipitation. Too much Cu in the at least one clad layer is undesirable because it lowers the hemming performance and worsens the corrosion behaviour, especially filliform corrosion. The Cu content in the at least one clad layer is up to 0.20, but preferably there is no addition of Cu to the clad layers such that the amount is, therefore, commensurate with that of an impurity.

Mn: The Mn content in the core layer is set to be 0.05-0.3. The Mn content in the at least one clad layer is set to be less than 0.15. Preferably, the Mn content in the at least one clad layer is less than 0.10. Manganese in the core alloy contributes to the bake hardening strength, and assists in controlling the grain size and the toughness of the heat-treated sheet. Excessive amounts in the at least one clad layer, however, increase the size of the Fe-containing particles with which Mn is associated in an undesired manner, thus adversely affecting bendability of the sheet product according to the invention.

Other elements such as but not limited to, Zn, Ni, Ti, B, Cr and V may be present in both the core layer and the at least one clad layer in the form of trace elements or impurities, or in the case of Ti and B through addition in the form of grain refiners. Each such trace element or impurity is present in an amount less than 0.05 each and less than 0.15 in total. The balance of the alloys is aluminium.

In a preferred embodiment of the invention, the clad automotive sheet product has a bending factor r/t measured according to ASTM E290 of less than 0.3 after 6 months natural ageing. In a more preferred embodiment the bending factor remains below 0.3 after 12 months natural ageing. Even more preferred, the bending factor is less than 0.25 after 6 months natural ageing and most preferably the bending factor is less than 0.25 after 12 months natural ageing.

In a further preferred embodiment the inventive product has a paint bake response of greater than 75 MPa.

The combination of core and clad layers according to the invention achieves a better hemming performance than a monolithic alloy containing the alloying elements of the core layer, retains the ability to age harden and, during and after age hardening, does not see a significant change in hemming performance.

In the following, the invention will be described in more detail by referring to the attached Figures which show the results of tests conducted on an embodiment of the claimed invention. Neither the detailed description nor the Figures are intended to limit the scope of protection which is defined by the appending claims.

EXAMPLES a) Sample Preparation

Figure 1:
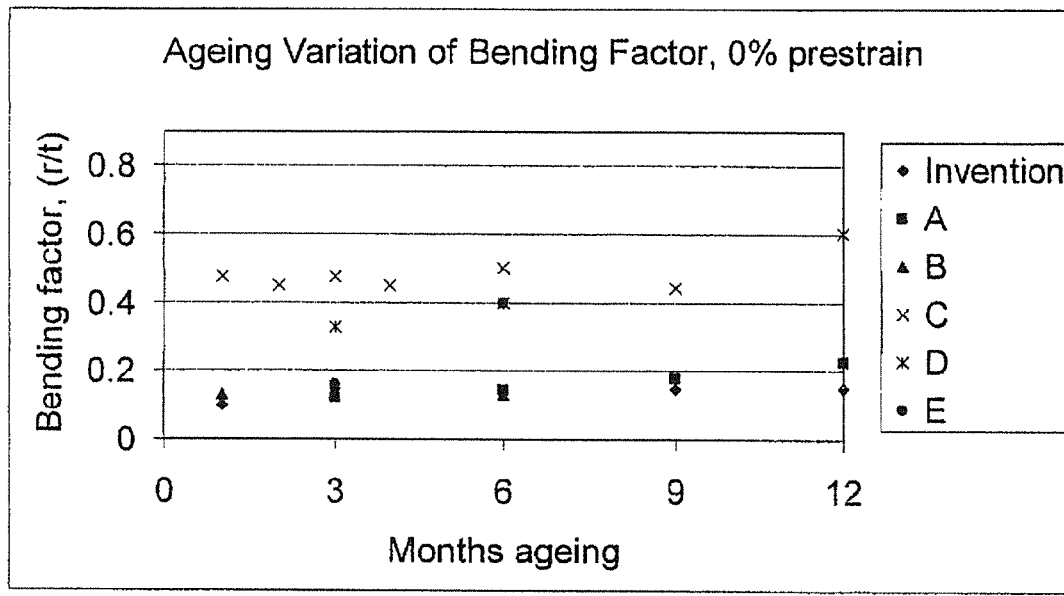
FIG. 1 is a plot of the variation of bending factor over time for the inventive and comparison products in the T4 state, zero prestrain before bending.

Composite ingots according to the invention were cast using the process described in WO 04/112992. The composite ingot had two identical composition clad layers, one each on either side of the core layer.

For comparison purposes, composite ingots were also cast using the casting process described in WO04/112992 to provide samples according to WO07/128391 and JP62-207642. In the case of the sample according to WO07/128391 the core layer was a 6016 alloy and the two clad layers were low solute 6XXX series alloys. In the case of the sample according to JP62-207642 the core layer was also a 6016 alloy and the two clad layers were of the same composition being a composition based on AA5005.

Further, established monolithic automotive sheet alloys AC170, AA6016 and the alloy according to EP1685268 were produced through conventional DC casting routes.

The chemical composition of the various samples tested is shown in Table 1. In every case ingots having a thickness of 560 mm were cast and then scalped to remove 25 mm from each side. In the case of the clad products this resulted in sheets where the two clad layers represented 10% of the total ingot thickness.

The ingots were then homogenized, hot and cold rolled using conventional practices to a final gauge of 1.0 mm.

The cold rolled sheet for all samples, (except the sample according to EP1685268), was then solution heat treated in a continuous solution heat treatment line to provide peak metal temperatures around 565° C. for 30 seconds. After solution heat treatment (SHT) the sheet was quenched and subjected to a pre-aging practice followed by slow cooling to room temperature.

Sheet according to composition B from Table 1 was solution heat treated at a lower temperature of 500° C. for 20 seconds, in accordance with the teaching of EP1685268. This sample was not given a pre-ageing treatment because, with this treatment, it is designed not to age-harden significantly.

All samples were allowed to artificially age for several days at room temperature to provide a delivery state of T4.

To assess age-hardening response after bake hardening (T8 temper), samples were subjected to the following cold forming and ageing treatment: 2% strain plus 185° C. for 20 minutes.

Samples of the T4 material were also subjected to different amounts of pre-strain to simulate the kind of forming used in the industry when making shaped parts. The amounts of additional pre-strain were 5, 10 and 15%. Bendability tests were used to measure hemming performance over periods up to 12 months, where the T4 sheet was left to age harden naturally, then pre-strained, then tested for bendability. Bendability was measured according to the procedure set out in the standard ASTM E290.

TABLE 1 composition of samples, all values in weight %.

| Sample | Mg | Si | Cu | Mn | Fe |
|---|---|---|---|---|---|
| Core composition (balance Al and impurities) | | | | | |
| Invention | 0.6 | 0.6 | 0.14 | 0.1 | 0.2 |
| A | 0.6 | 0.5 | 0.1 | 0.15 | 0.2 |
| B | 0.4 | 0.4 | 0.08 | 0.07 | 0.17 |
| C | 0.55 | 1.1 | 0.08 | 0.07 | 0.21 |
| D | 0.55 | 1.1 | 0.08 | 0.07 | 0.21 |
| E | 0.55 | 1.1 | 0.08 | 0.07 | 0.21 |
| Clad composition (balance Al and impurities) | | | | | |
| Invention | 0.5 | 0.5 | | 0.1 | 0.2 |
| A | No clad layer - monolithic | | | | |
| B | No clad layer - monolithic | | | | |
| C | No clad layer - monolithic | | | | |
| D | 0.72 | 0.15 | 0.01 | 0.02 | 0.18 |
| E | 0.4 | 0.4 | 0.08 | 0.07 | 0.17 |

Comparative example A is a composition otherwise known as AC170 and is a monolithic composition very similar to the core layer composition of the invention.

Comparative example B is a monolithic alloy according to EP1685268.

Comparative example C is a monolithic alloy falling within the range of the established automotive sheet alloy AA6016.

Comparative example D is a clad product with a 6016 alloy core and 5XXX series alloy clad layers according to JP62-207642.

Comparative example E is a clad product with a 6016 alloy core and 6XXX series alloy clad layer similar to those described in WO07/128391.

b) Tensile Properties

The tensile properties of all the samples were measured using a Zwick test machine Z050.

Table 2 below shows the tensile test data, yield strength and ultimate tensile strength for the as-delivered T4 state and after bake hardening according to the conditions specified above. (All values in MPa).

TABLE 2

| | T4 | | T8 | | |
|---|---|---|---|---|---|
| | YS | UTS | YS | UTS | PBR |
| Invention | 95 | 194 | 175 | 238 | 80 |
| A | 95 | 200 | 217 | 265 | 122 |
| B | 70 | 129 | 94 | 149 | 24 |
| C | 115 | 225 | 245 | 295 | 130 |
| D | 100 | 205 | 190 | 235 | 90 |
| E | 105 | 205 | 190 | 230 | 85 |

It can be seen that the paint bake response (PBR) of the inventive product is reasonable at a level of around 80 MPa. Although this response is a little lower than samples A or C, it is significantly higher than sample B and remains useful for automotive designers. Furthermore, it is comparable to the level of paint bake response obtained with prior art clad products.

In addition the yield strength in the T4 condition is lower than the yield strengths of the comparative clad samples D and E which means the inventive product provides better bulk formability than these products too.

c) Bending Properties

Figure 2:
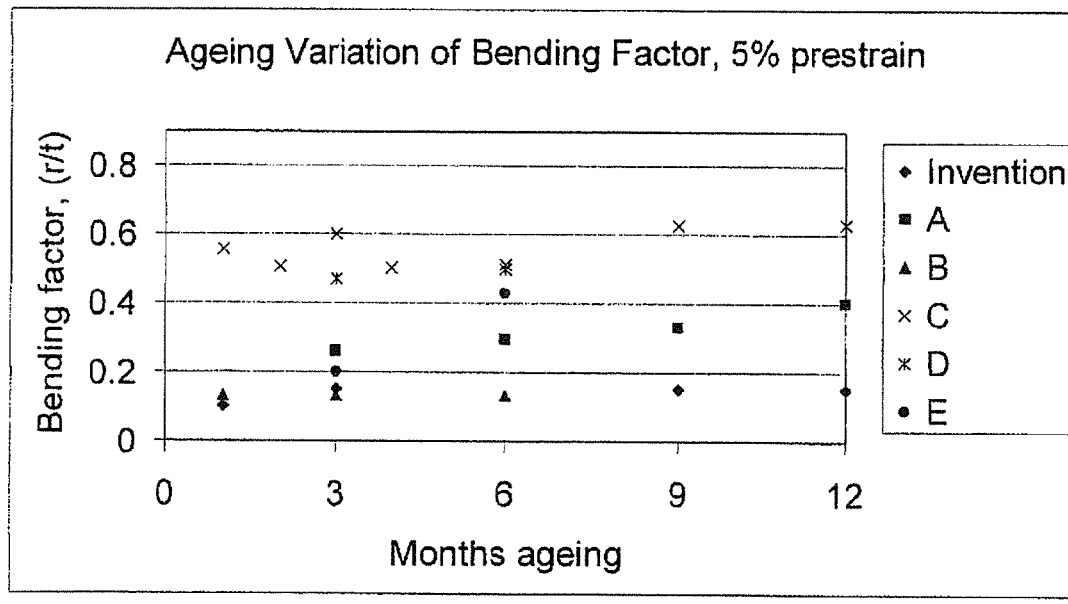
FIG. 2 is a plot of the variation of bending factor over time for the inventive and comparison products in the T4 state, 5% prestrain before bending.
Figure 3:
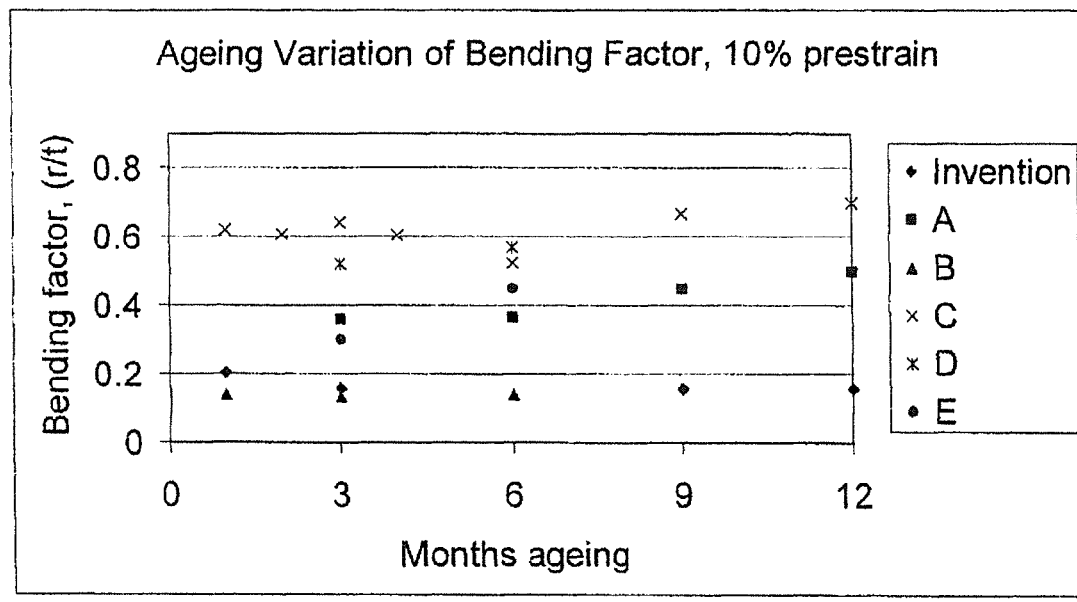
FIG. 3 is a plot of the variation of bending factor over time for the inventive and comparison products in the T4 state, 10% prestrain before bending.
Figure 4:
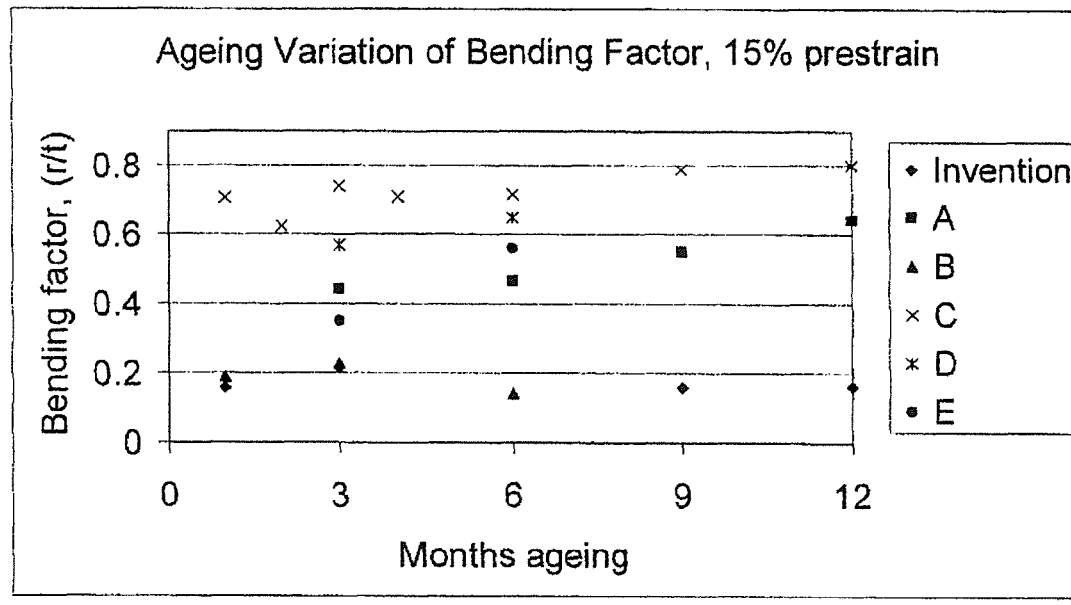
FIG. 4 is a plot of the variation of bending factor over time for the inventive and comparison products in the T4 state, 15% prestrain before bending.

The bending behaviour is presented in the attached FIGS. 1 to 4.

The bending factor of the inventive product remains relatively constant over a 12 month period and remains at a level well below 0.3. It does not matter, either, if the amount of prestrain before testing was varied.

In contrast, the bending factor for sample A (the monolithic alloy with the same composition as the core alloy layer of the invention) at 0% prestrain was also at a low value and reasonably constant over time with 0% prestrain, (a slight increase may be detected). However, once the prestrain increases, the tendency is for the bending factor to be higher and to see more of an increase over time. Even after 5% prestrain there is a significant change over time in the bending factor value such that the value is above 0.3 after 6 months ageing. At 10% prestrain after 6 months ageing the bending factor was 0.36 but this increased over the next 6 months to a value of 0.5.

Sample B, being the sample with a low paint bake response as seen above, has, like the inventive product, an excellent bendability that remains stable over time, regardless of prestrain.

Sample C, the moderately high strength monolithic 6016 alloy, has a relatively poor bending factor value, being around 0.5 or well above this value.

Sample D, being the 6016 alloy core with 5XXX series clad layers had a bending factor after 0% prestrain and 3 months ageing of 0.33 but this increased slightly to a value of 0.4 after 6 months ageing. More significant changes in the bending factor were observed when the sample was subjected to prestrains of 5, 10 and 15% such that the bending factor rose to values within the range of 0.5 to 0.65.

Sample E, being the 6016 alloy core with low solute 6XXX series clad layers generally had lower bending factors than sample D. Indeed at 0% prestrain and 3 months ageing the bending factor was very low at 0.16. However the bending factor increased over time, and the rate of change was relatively steep compared with some of the other samples tested, such that after 6 months ageing and regardless of the amount of prestrain, the bending factor was always at or above 0.4.

In conclusion, the analysis of the tensile date in combination with the bending data shows that the inventive product provides excellent hemmability which remains relatively constant over time, regardless of the amount of prestrain before bending, and yet is able to provide a reasonable level of bake hardenability. None of the prior art samples tested offered this combination of properties. Once formed, a sheet product of the invention can be hardened during baking treatments whereas monolithic alloys with the same bending behaviour may not.

The product according to the invention is ideally suited for use in automotive structures.

The invention claimed is:

1. An automotive clad sheet product comprising a core layer and at least one clad layer wherein the core layer comprises an alloy of the following composition in weight %:

|    |            |
|----|------------|
| Mg | 0.45-0.8   |
| Si | 0.45-0.7   |
| Cu | 0.05-0.25  |
| Mn | 0.05-0.2   |
| Fe | up to 0.35 | with other elements <0.05 each and <0.15 in total, and the balance aluminium; and the at least one clad layer comprises an alloy of the following composition in weight %:

|    |            |
|----|------------|
| Mg | 0.3-0.7    |
| Si | 0.3-0.7    |
| Mn | up to 0.15 |
| Fe | up to 0.35 | with other elements <0.05 each and <0.15 in total, and the balance aluminium,
wherein the bending factor, as measured according to ASTM E290, is below 0.3 after 6 months natural ageing.

2. The clad sheet product according to claim 1, wherein the product comprises two clad layers with one clad layer on each side of the core layer.

3. The clad sheet product according to claim 2, wherein the two clad layers are of the same composition.

4. The clad sheet product according to claim 1, wherein the Mg content in the at least one clad layer is 0.4-0.6.

5. The clad sheet product according to claim 1, wherein the Mg content in the at least one clad layer is about 0.5.

6. The clad sheet product according to claim 1, wherein the Si content in the at least one clad layer is 0.4-0.6.

7. The clad sheet product according to claim 1, wherein the Si content in the at least one clad layer is about 0.5.

8. The clad sheet product according to claim 1, wherein the Mg content in the core layer is 0.5-0.7.

9. The clad sheet product according to claim 1, wherein the Mg content in the core layer is about 0.6.

10. The clad sheet product according to claim 1, wherein the Si content in the core layer is 0.5-0.7.

11. The clad sheet product according to claim 1, wherein the Si content in the core layer is about 0.6.

12. The clad sheet product according to claim 1, wherein the bending factor, as measured according to ASTM E290, is below 0.3 after 12 months natural ageing.

13. The clad sheet product according to claim 1, wherein the bending factor, as measured according to ASTM E290, is below 0.25 after 6 months natural ageing.

14. The clad sheet product according to claim 1, wherein the bending factor, as measured according to ASTM E290, is below 0.25 after 12 months natural ageing.

15. The clad sheet product according to claim 1, wherein the paint bake response is greater than 75 MPa.

16. The clad sheet product according to claim 1, wherein the product is for use in an automotive structure.

17. The clad sheet product according to claim 16, wherein the automotive structure is a panel or a hood.

* * * * *